May 31, 1927.  A. LUDASY  1,630,623

HYDROCRAFT

Filed July 21, 1925   9 Sheets-Sheet 1

Inventor
A. Ludasy
By Bryant & Lowry
Attorneys

May 31, 1927.

A. LUDASY 1,630,623

HYDROCRAFT

Filed July 21, 1925

9 Sheets-Sheet 2

Inventor
A. Ludasy
By Bryant & Lowry
Attorneys

May 31, 1927.

A. LUDASY 1,630,623

HYDROCRAFT

Filed July 21, 1925 9 Sheets-Sheet 3

Inventor
A. Ludasy
By Bryant H Lowry
Attorneys

May 31, 1927.
A. LUDASY
1,630,623
HYDROCRAFT
Filed July 21, 1925
9 Sheets-Sheet 4
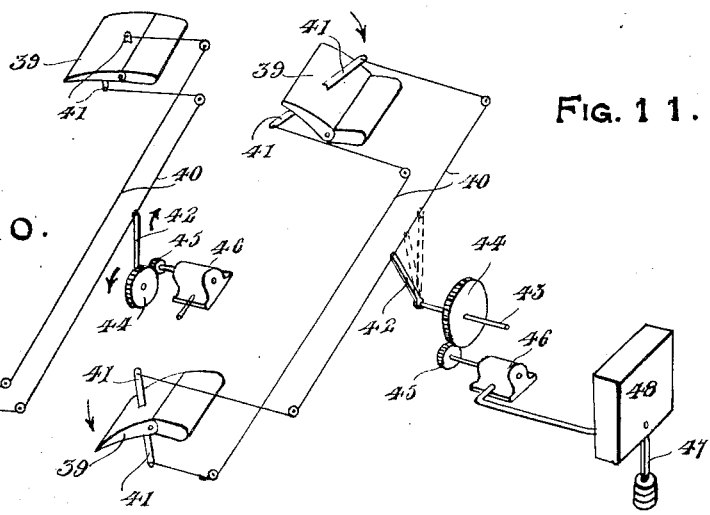
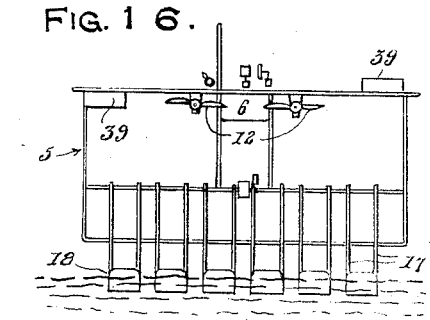
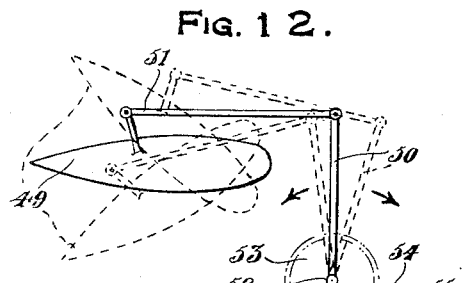
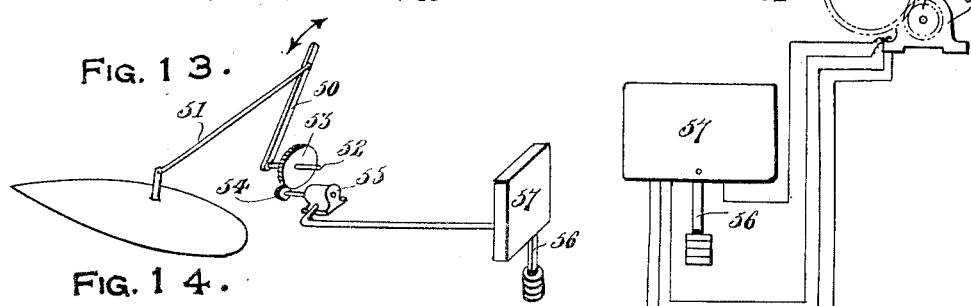
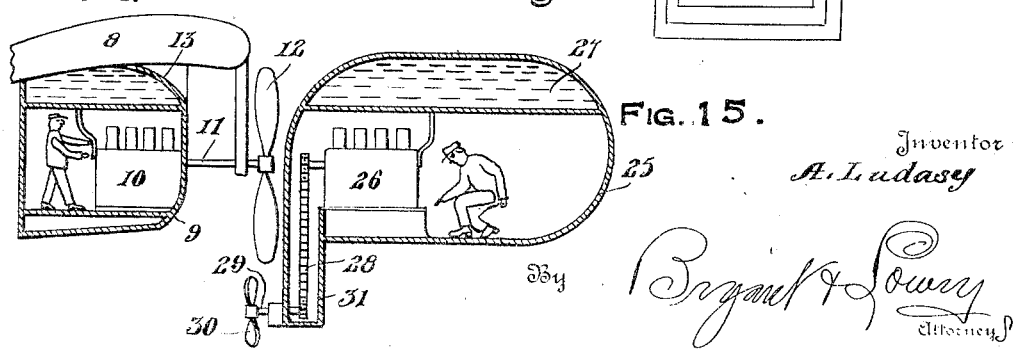
Inventor
A. Ludasy
By Bryant & Lowry
Attorneys May 31, 1927.

A. LUDASY 1,630,623

HYDROCRAFT

Filed July 21, 1925

9 Sheets-Sheet 5

Inventor
A. Ludasy

By Bryant & Lowry
Attorneys

May 31, 1927.
A. LUDASY
1,630,623
HYDROCRAFT
Filed July 21, 1925
9 Sheets-Sheet 6
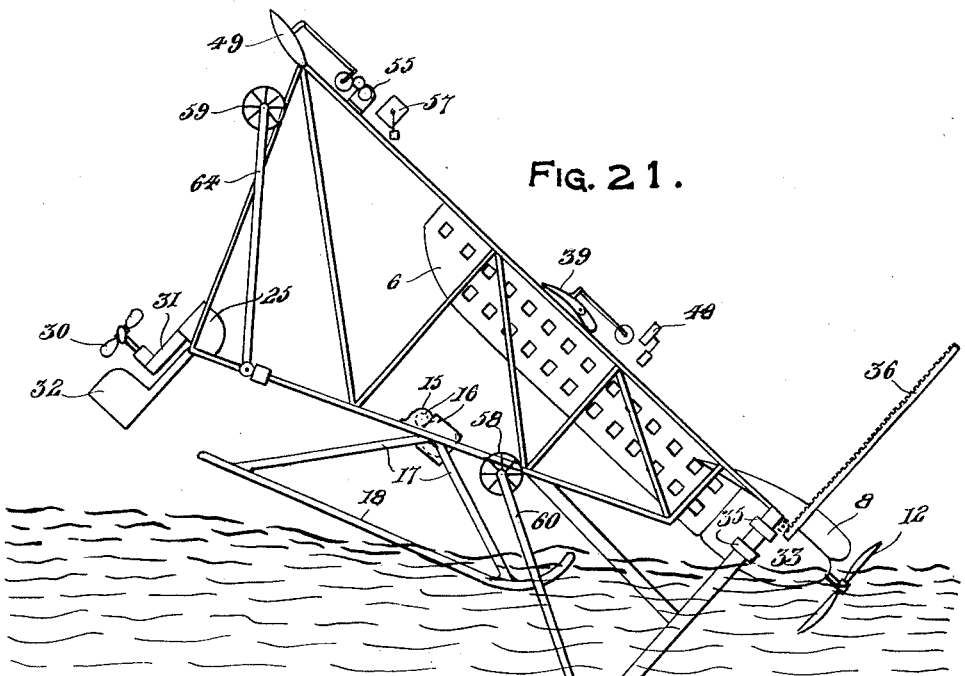
FIG. 21.
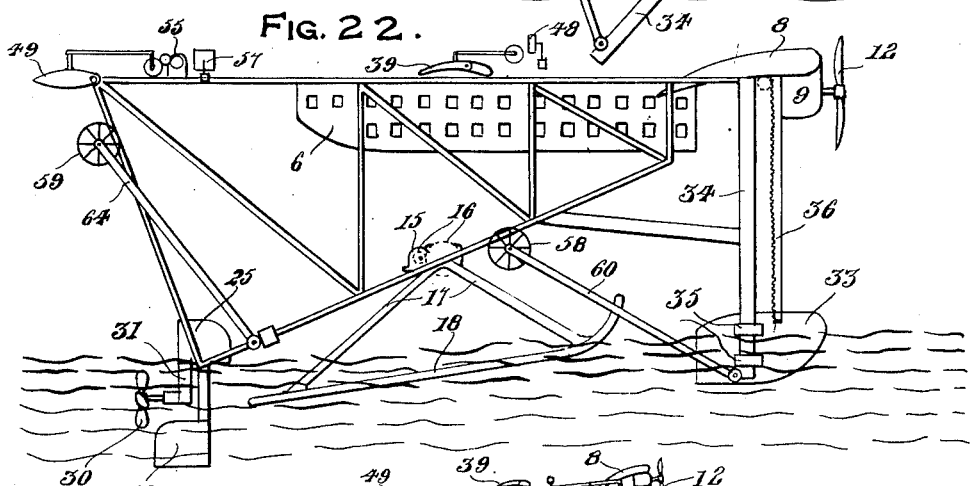
FIG. 22.
FIG. 23.
Inventor
A. Ludasy
By Bryant & Lowry
Attorneys

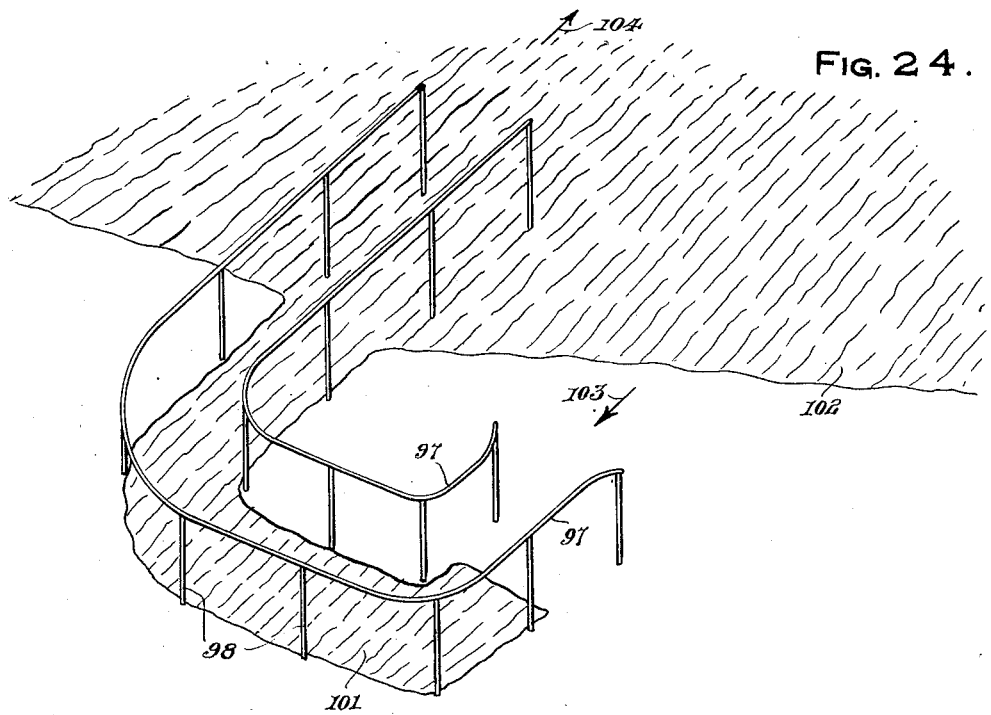
FIG. 24.
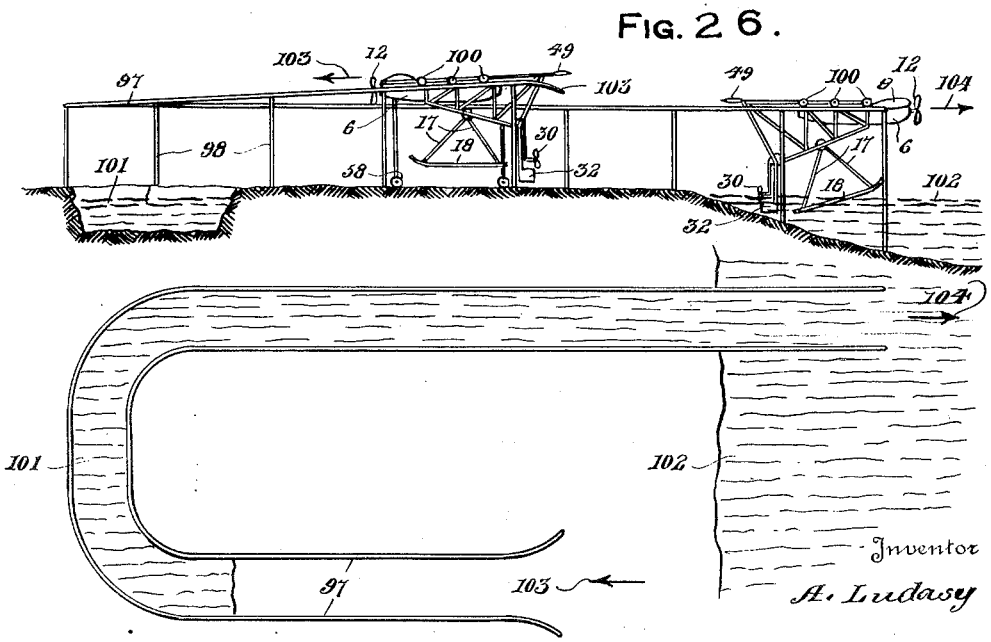
FIG. 26.
FIG. 25.

May 31, 1927. A. LUDASY 1,630,623

HYDROCRAFT

Filed July 21, 1925 9 Sheets-Sheet 9

Inventor
A. Ludasy
By Bryant & Lowry
Attorneys

Patented May 31, 1927.

1,630,623

UNITED STATES PATENT OFFICE.

AKOS LUDASY, OF WILKINSBURG, PENNSYLVANIA.

HYDROCRAFT.

Application filed July 21, 1925. Serial No. 45,078.

This invention relates to new and useful improvements in hydrocrafts.

The primary object of the invention is to provide an improved form of oceanic hydrocraft capable of transporting heavy loads, such as many passengers and cargo.

A further object of the invention is to provide a device of the above referred to type which will travel upon the crest of the water and will have the major portion of its bulk carried well above the same.

A still further object of the invention is to provide a hydrocraft which is sustained or supported while traveling by a series of pontoons and a monoplane.

Another object of the invention is to provide a craft which is propelled by means of air and water screws.

Still another object of the invention is to provide stabilizing mechanism for assuring longitudinal and lateral stability or equilibrium.

A further object of the invention is to provide land gear for permitting the craft to leave the water and travel on land.

Another object of the invention is to provide a landing and take-off track or bridge by means of which the craft may be safely handled during periods when loading and unloading is being performed.

Other objects and advantages of the invention will be apparent during the course of the following description.

Figure 1:
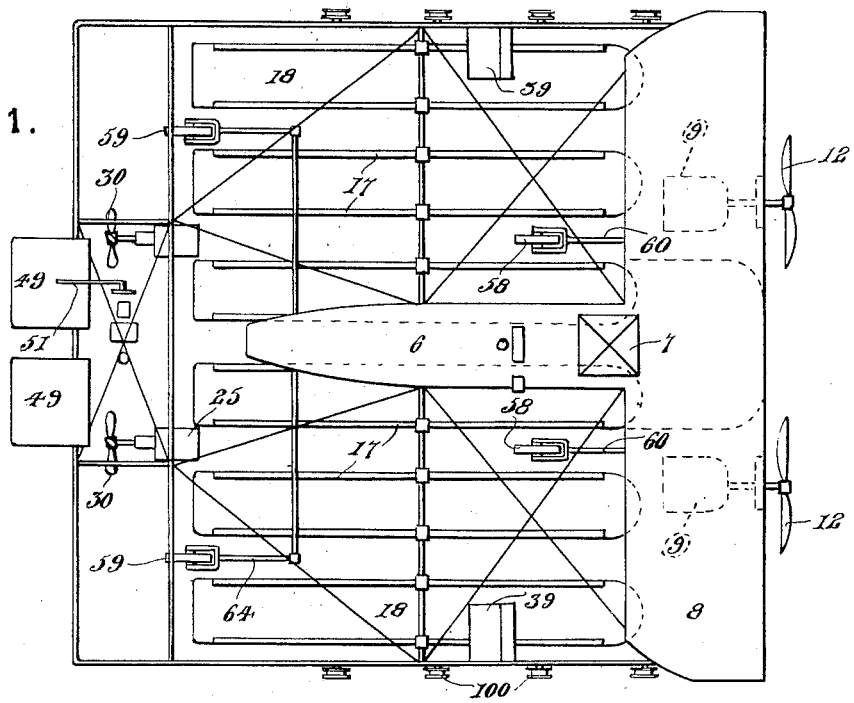
Figure 2:
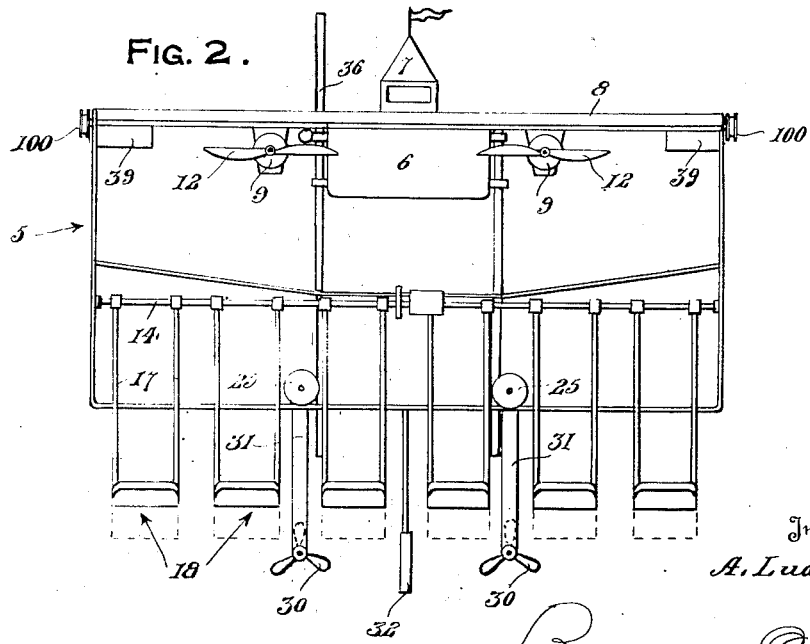
Figure 3:
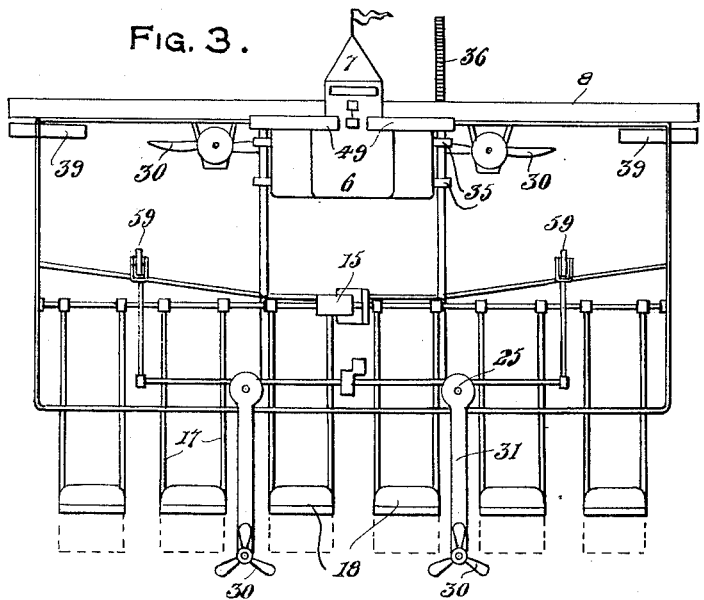
Figure 8:
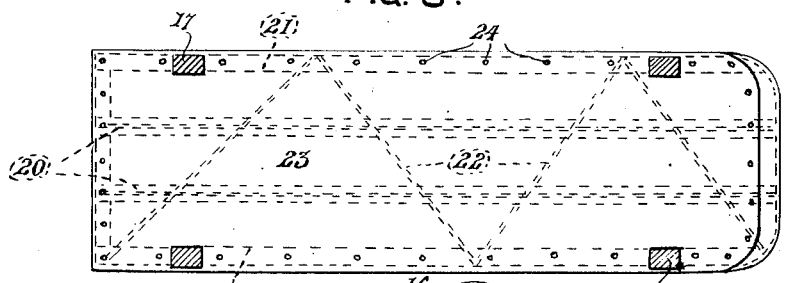
Figure 7:
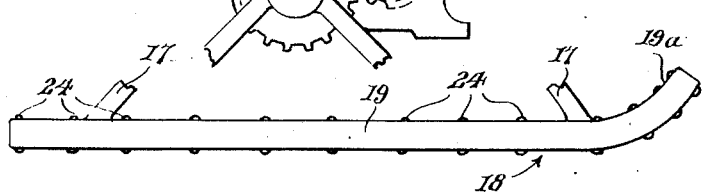
Figure 9:
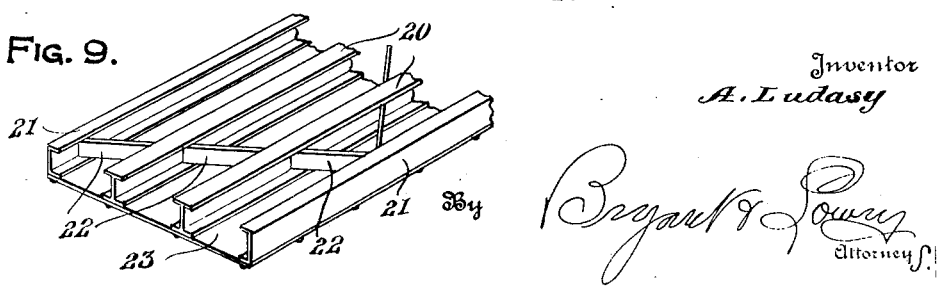
Figure 4:
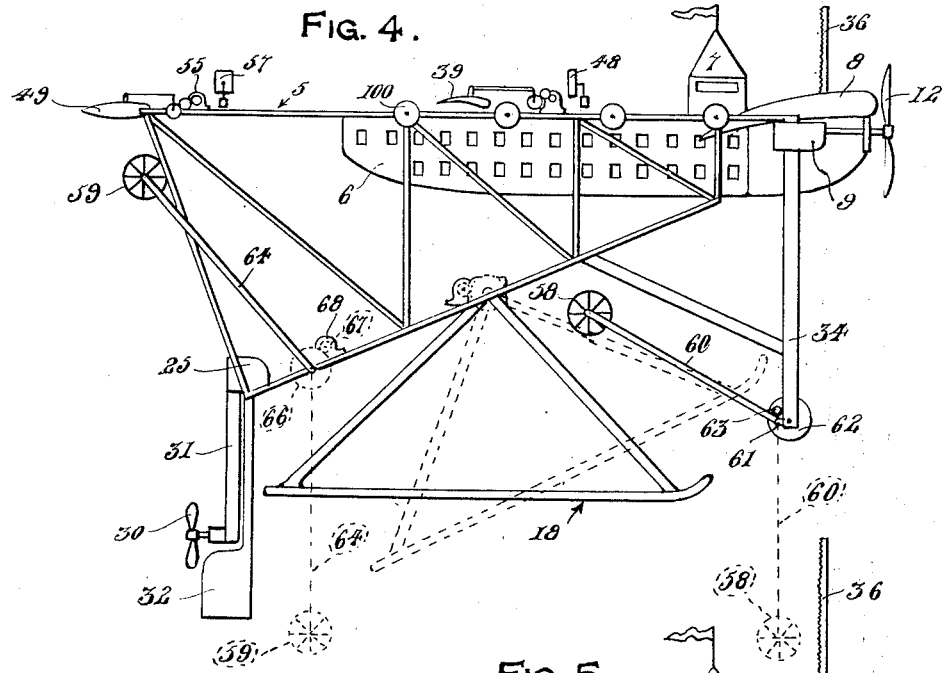
Figure 5:
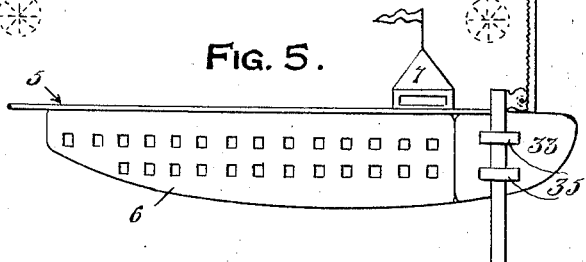
Figure 6:
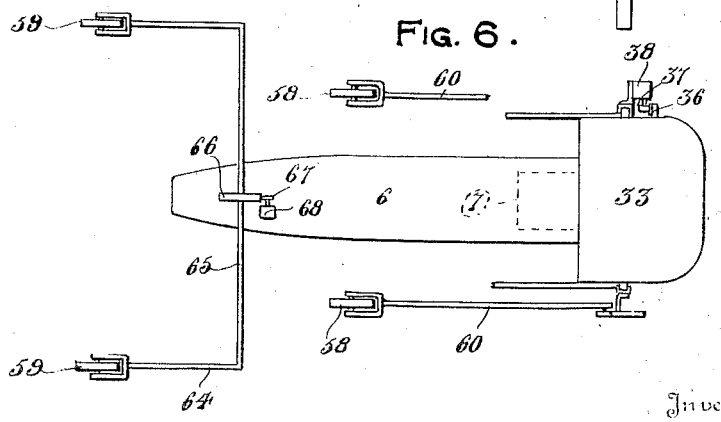
Figure 17:
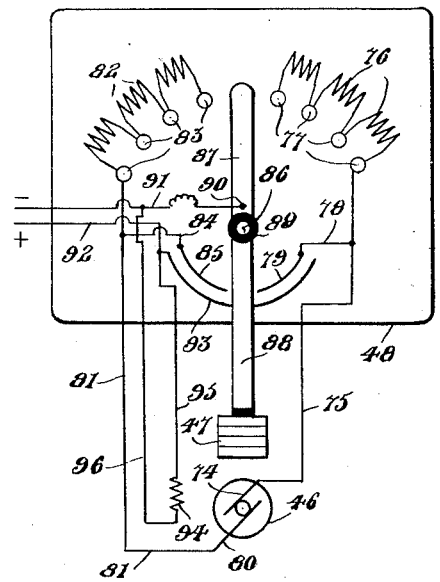
Figure 18:
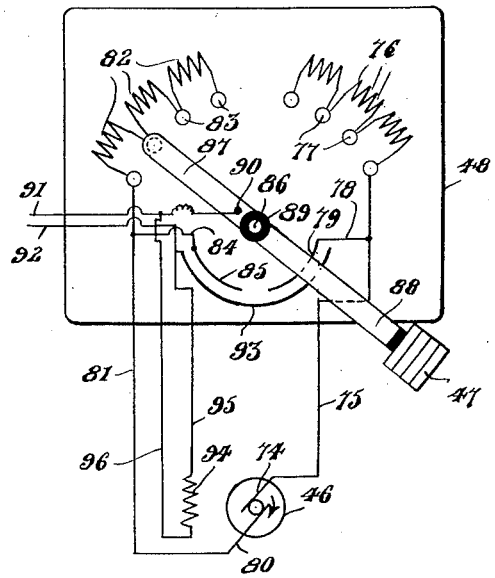
Figure 19:
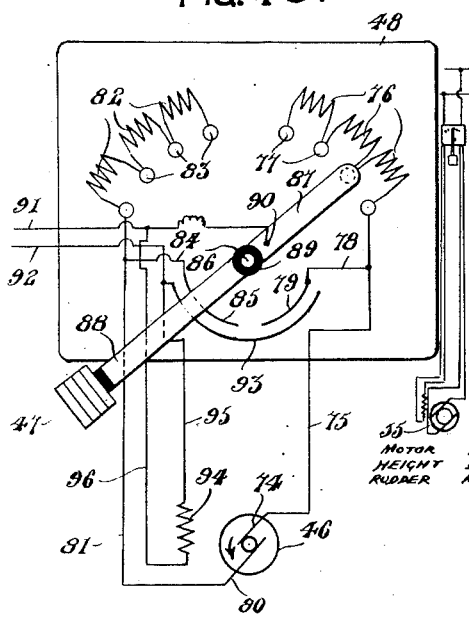
Figure 20:
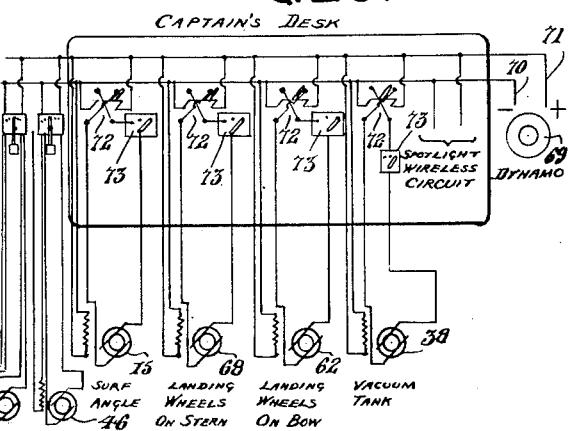
Figure 27:
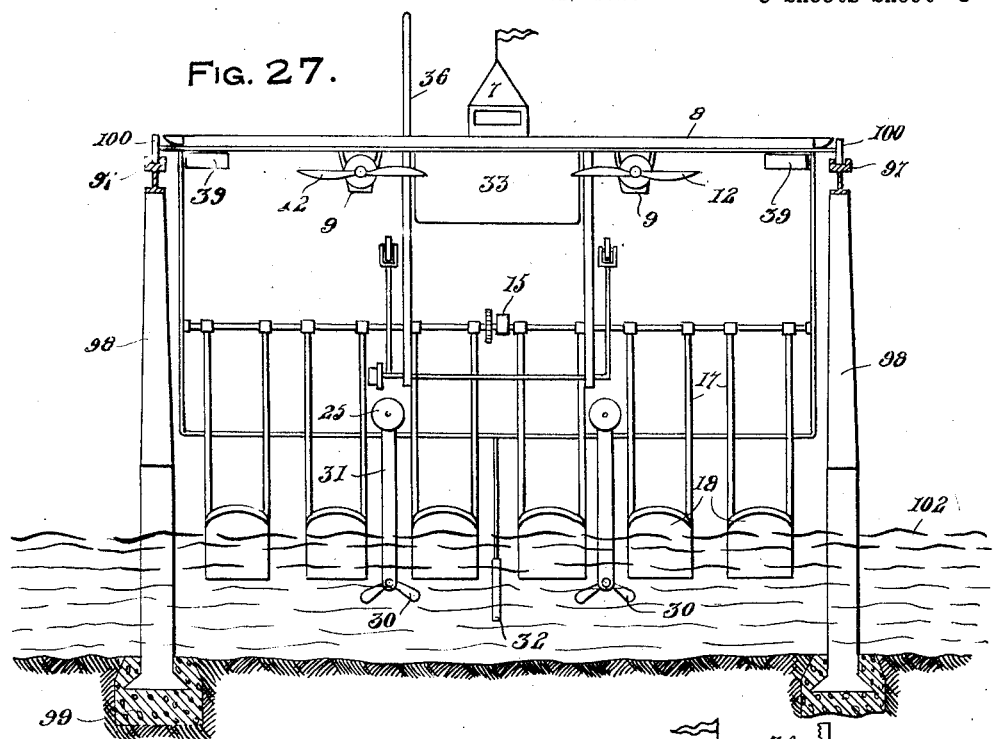
Figure 28:
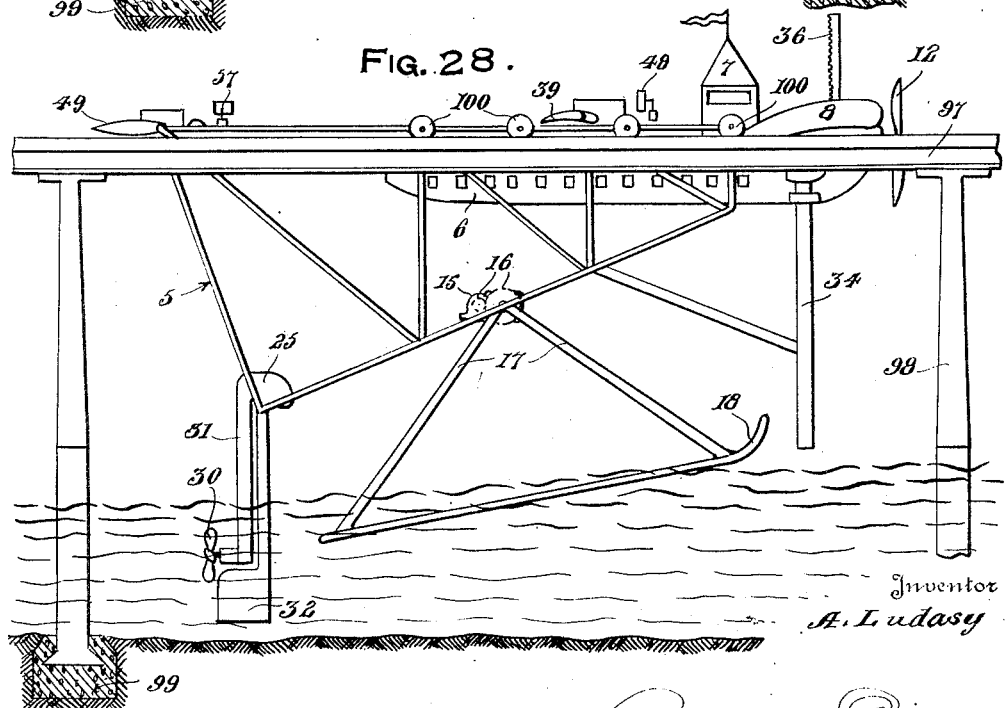
Figure 32:
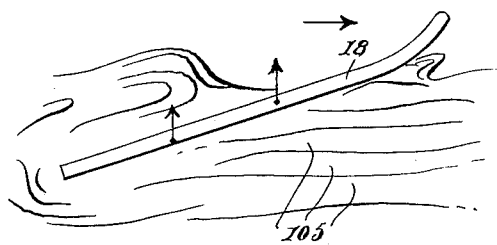
Figure 33:
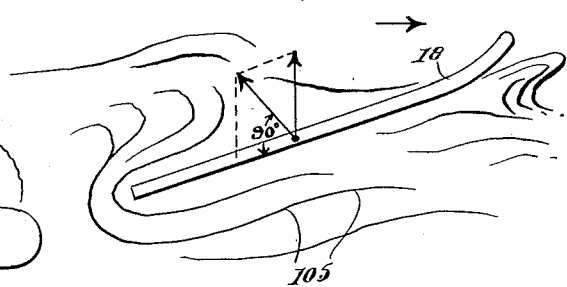
Figure 34:
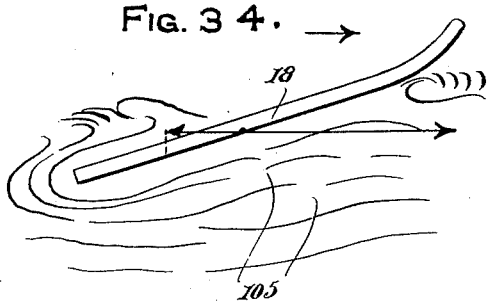

In the accompanying drawings forming a part of this specification and in which like numerals are employed to designate like parts throughout the same, Figure 1 is a top plan view of the hydrocraft embodying this invention, Figure 2 is a front elevational view of the craft shown in Fig. 1, Figure 3 is a rear elevational view of the craft, Figure 4 is a side elevational view of the craft and illustrates in dotted lines the land gear shifted from its inoperative to its operative position and, also, the movement of the pontoons or skids, Figure 5 is a side elevational view of the cabin portion of the craft, the pilot house carried thereby, and a vacuum tank on float with its adjusting mechanism, Figure 6 is a bottom plan view of the structure shown in Fig. 5 with the land gear shown associated therewith, Figure 7 is a fragmentary side elevational view of one of the pontoons or skids and its adjusting mechanism, Figure 8 is a top plan view of one of the pontoons or skids and shows in dotted lines the framework or skeleton portion of the same, Figure 9 is a fragmentary perspective view of one of the pontoons or skids and better illustrates the skeleton framework embodied in the same, Figure 10 is a detail perspective view of the ailerons employed for providing lateral stability or equilibrium and a portion of the stabilizing mechanism operatively associated therewith, Figure 11 is a similar view to Fig. 10, but shows a stabilizer mechanism after it has been actuated to control the ailerons, Figure 12 is a detail elevational view of one of the elevator rudders, employed for longitudinal stability or equilibrium, and its stabilizing mechanism, Figure 13 is a perspective view of the structure shown in Fig. 12, Figure 14 is a sectional view of one of the engine cabins and further illustrates in side elevation the monoplane to which the cabin is attached and the tractor screw operated by the engine located in the said cabin, Figure 15 is a vertical sectional view of an engine cabin and shows in elevation one of the marine screws or propellers and its driving engine, Figure 16 is a diagrammatic view of the craft as it appears in the water, Figures 17 to 19 inclusive are diagrammatical views showing the type of stabilizer control employed in connection with the elevator rudders and the ailerons, Figure 20 shows diagrammatically the electric control system of wiring for the various controllable portions of the craft, Figure 21 is a side elevational view of the hydrocraft embodying this invention as it appears when in the water and at a time when the forward travel of the same has been checked, the craft being illustrated as tipped forwardly due to the overbalanced condition of the same when being supported in the water by the pontoons or skids only, Figure 22 is a similar view to Fig. 21, but shows the craft supported by the pontoons or skids and a forwardly located vacuum tank which functions to elevate the front end of the craft when drifting or traveling at a very slow rate of speed, Figure 23 is a side elevational view of the craft with the land gear in operation and with the craft traveling upon land, Figure 24 illustrates in perspective a landing and take-off track, Figure 25 illustrates the structure shown in Fig. 24 in top plan, Figure 26 is a side elevational view of the structure shown in Figs. 24 and 25 and illustrates the manner in which the craft is handled by the same, Figure 27 is a front elevational view of the craft supported by and traveling upon the take-off portion of the track shown in Figs. 24 to 26 inclusive, Figure 28 is a side elevational view of the structure shown in Fig. 27, Figures 29 to 31 inclusive are diagrammatic views of the monoplane, which forms a part of the craft embodying this invention, and the air current surrounding the same while the craft is traveling, and Figures 32 to 34 inclusive illustrate diagrammatically one of the pontoons or skids and the water currents surrounding the same while the craft is traveling.

In the drawings, wherein for the purpose of illustration is shown a preferred embodiment of this invention, the numeral 5 designates the framework or body portion of the craft which may be constructed in any desired manner and of any configuration, although, it is preferred that it be of triangular formation in side elevation, as illustrated in Fig. 4. Suitably fastened to the framework or body portion 5 at the upper forward portion of the same is a passenger and cargo cabin 6 which has mounted upon the forward end thereof a pilot house 7.

Traversing the front end of the frame or body portion 5 and located substantially on the same plane as the upper portion of the body is a monoplane 8 which is employed, while the craft is traveling, to maintain the front of the craft suitably elevated.

In Fig. 14 there is shown in vertical section an engine cabin 9 which is suspended from the monoplane 8 and is provided with an engine 10 having a drive shaft 11 projecting forwardly therefrom upon which is mounted the tractor screw or propeller 12. This cabin 9 is further illustrated as being provided with a fuel tank 13 from which the engine 10 receives its supply. Two of these cabins 9 are illustrated in several of the figures and are shown as being arranged laterally of each side of the central vertical plane of the craft. These tractor screws 12 constitute part of the propelling or driving mechanism of the craft and are purely of the aerial type.

The framework or body portion 5 is provided with a transversely extending shaft 14 which may be rotated or rocked in opposite directions by the motor 15, best shown in Fig. 7, and the train of gears 16. This shaft 14 has fastened thereto, at suitably spaced intervals, the downwardly diverging pairs of arms or struts 17. To the lower end of every two of such pairs of arms or struts 17 is fastened a pontoon or skid, designated in its entirety by the reference numeral 18.

In Figs. 7 to 9 inclusive, one of these pontoons or skids shown in detail so that the features of construction embodied in the same may be properly understood. Fig. 7 shows a pontoon or skid in side elevation and clearly illustrates that the same is formed in a similar manner to a surf board, i. e., with a flat body portion 19 having an upwardly turned end 19ª. This pontoon is formed from a plurality of beams which extend lengthwise thereof and include the intermediate I-beams 20 and the side channel beams 21. Diagonally extending brace members 22 are provided and function to reinforce the beams to prevent buckling of the same. Top, bottom, and end plates 23 are provided and are riveted, as at 24, to the various beams 20 and 21 for forming with the various beams a plurality of air-tight compartments. It will now be understood that this craft will be supported, while in the water, by the pontoons or skids 18. Figure 4 is intended to illustrate, in part, the movement of these pontoons or skids 18, brought about by the electric motor 15, for enabling the craft to be properly handled under different water conditions, or while traveling over calm or rough water.

The marine propulsion mechanism carried by this craft includes a pair of engine cabins 25 which are arranged on opposite sides of the central vertical plane of the device. Fig. 15 shows one of these cabins in vertical section and illustrates therein an engine 26 which is supplied with fuel from the compartment 27, formed in the cabin 25, and has a chain and sprocket drive mechanism 28 connecting the propeller shaft 29 to the engine 26. The marine propeller 30 is mounted upon this shaft 29 which is arranged at the lower end of the depending housing 31 carried by the rear end portion of the cabin 25. The various figures showing the marine propulsion mechanism also illustrate the rudder 32 which is located substantially in the central vertical plane of the craft and is intended to steer the same laterally in either direction while traveling on the water.

It will now be clearly understood that with the various engines 10 and 26 operating to drive the screws or propellers 12 and 30, while the craft is riding upon the pontoons 18, will drive the vessel at a high rate of speed and the cabin 6 will be properly supported to reside on a horizontal plane. If it is necessary to stop the forward travel of the craft, while in the water, the same will become overbalanced and will dip forwardly, as illustrated in Fig. 21. To right the craft or maintain the cabin 6 truly horizontal, a large airtight tank or chamber 33 is provided and is slidably mounted upon the vertically extending guides 34 by means of the straps, or other suitable elements, 35. This tank or chamber 33 is provided with a perpendicularly extending rack bar 36, the teeth of which are engaged by a pinion 37 carried by the armature shaft of the motor 38. It will now be seen that this rack and motor mechanism may be employed for slidably moving the tank or chamber 33 along the guides 34 to arrange the said tank at either end of the guides, as shown in Figs. 21 and 22. With the tank or chamber 33 located at the lower ends of the guides 34, the craft will be supported in the manner illustrated in Fig. 22. When the craft is again started and sufficient speed is obtained to permit the monoplane 8 to sustain the front portion of the craft, the tank or chamber 33 may be moved up the guideways 34 into its inoperative position in horizontal alinement with the cabin 6.

To assure lateral stability or equilibrium, the framework or body portion 5 is provided with the ailerons 39 which are located one at each side thereof. These ailerons are intended to prevent the craft from tipping to either side and are automatically controlled by the stabilizer mechanism best illustrated in Figs. 10 and 11. This stabilizer mechanism includes the control cords 40 which are connected to the arms 41 projecting above and below the ailerons. Connected to one of the cords 40 is an arm 42 which is fastened to the rock shaft 43 provided with the gear 44. Meshing with this gear is a pinion 45 carried by the armature shaft of the electric motor 46 which is controlled by the pendulum member 47 that will be described in detail at a later point as controlling a switch mechanism housed within the casing 48. The tilting of the craft laterally in either direction will naturally cause the pendulum 47 to swing in a proper direction to establish a suitable circuit for driving the electric motor in the proper direction to move the ailerons 39 for counteracting the tilting or tipping of the craft.

The elevator rudders 49 are carried by the rear portion of the frame or body 5 and are controlled by the stabilizer mechanism 50 which is best illustrated in Figs. 12 and 13. These elevator rudders 49 are intended to prevent the craft from tipping by the bow or the stern and will be tilted either upwardly or downwardly as illustrated in Fig. 12, for counteracting such tipping. The stabilizer mechanism includes a rock arm 50 which is connected to the elevator rudder 49 by the link 51 and is carried by the rock shaft 52 having the gear 53 meshing with the pinion 54 carried by the armature shaft of the electric motor 55. The direction of rotation of this armature shaft is controlled by the pendulum 56 that actuates circuit making and breaking means housed within the casing 57. This circuit making and breaking means is the same type of mechanism as is housed within the casing 48 and will be described in detail at a later point when Figs. 17 to 20 are specifically referred to.

To permit the craft to travel upon land, the front and rear ground engaging wheels 58 and 59 are provided. The front ground engaging wheels 58 are carried by the arms 60 which are carried by the rotatable shaft 61 that is secured to the lower ends of the guides 34. A motor 62 is carried by one of these guides and is provided with a power transmission connection 63 with the shaft 61 so that the arms 60 may be moved to arrange the ground engaging wheels in the position illustrated in dotted lines in Fig. 4. The rear ground engaging wheels 59 are carried by the arms 64 projecting from the opposite ends of the shaft 65 which is provided with a gear 66 driven by the pinion 67 which is carried by the armature shaft of the motor 68. The suitable rotation of the armature shaft of this motor will cause the arms 64 to move for placing the ground engaging wheels 59 in the position illustrated in dotted lines in Fig. 4. It will now be seen that the craft will be supported by these front and rear ground engaging wheels 58 and 59 and that the traction screws or propellers 12 may be employed for propelling the craft over the ground, as illustrated in Fig. 23.

In Fig. 20 there is shown the wiring system and the controls for the various electric motors employed for operating the tank 33, the front and rear landing wheels, and the angularity of the surf pontoons or skids. This system also includes the wiring for the stabilizer mechanism employed for controlling the positions of the ailerons 39 and elevator rudders 49. The system is supplied with current by the dynamo 69 and the various motors and their independent circuits are connected to the lead wires 70 and 71. It is to be understood that the motors 15, 38, 62 and 68, which are suitably labeled in this Figure 20, must be rotated in opposite directions for bringing about the proper control of the various elements connected thereto. In view of this fact, each of the circuits for these various motors is provided with a polarity reversing switch 72 while a rheostat 73 is connected in the armature circuit to permit each motor to be driven at any desired speed. It is believed unnecessary to describe in detail the features of any of these control mechanisms as the wiring is clearly illustrated and the motors are of the shunt wound type and are reversed by reversing the polarity of the armature circuit.

The pendulum actuated switches for controlling the stabilizer motors 46 and 55 are slightly more complicated and it is believed advisable to describe the operation of one of the same. The circuit making and breaking means illustrated in Figs. 17 to 19 inclusive will be considered as constituting the mechanism housed within the casing 48 and as being employed for controlling the electric motor 46 connected to the ailerons 39. The commutator brush 74 is connected by the wire 75 to one end of the resistance winding 76 which includes the various taps 77. This wire 75 is also connected by the branch wire 78 to an arcuate contact strip 79. The second commutator brush 80 is connected by the wire 81 to the second resistance winding 82 which is provided with the taps 83. A branch wire 84 connects the wire 81 with an arcuate contact strip 85 arranged on the same arc as the strip 79. The stem for the pendulum 47 is pivoted at 86 and is formed with the sections 87 and 88 which are insulated from each other at 89. Connected to the portion 87, at 90, is the negative line 91. The positive line 92 is connected to the arcuate contact 93 which extends in parallelism with the arcuate contact strips 79 and 85 and the portion 88 of the pendulum stem is intended to bridge the gaps between these contacts 79, 85 and 93. The outer end portion of the part 87 of the pendulum stem is intended to engage the various taps 77 and 83 of the resistance windings 76 and 82 respectively. The motor field 94 is connected by the wire 95 to the positive line 92 and by the wire 96 to the negative line 91.

Figure 18 shows the pendulum shifted or swung toward the right by the tilting of the craft. This swinging of the pendulum will establish the brush circuit in the following manner. The negative line 91 will be connected by the stem portion 87 to one of the taps 83 of the resistance winding 82. The current will flow through one of these resistance sections to the wire 81 through which it will pass to the brush 80. The circuit will include the brush 74, the wire 75 connected to the arcuate contact 79 by the branch wire 78 and the stem portion 88 will establish a connection between the contact 79 and the contact 93. This latter contact is connected to the positive lead wire 92. The polarity of the field winding 94 will always be the same in view of the fact that it is connected directly across the lines or wires 91 and 92.

When the pendulum 47 is swung in the opposite direction, the armature of the motor 46 will rotate in the opposite direction to the direction of rotation indicated by the arrow in Fig. 18. In Fig. 19 the pendulum 47 is illustrated as being swung in the opposite direction to that illustrated in Fig. 18 and the circuit for the brushes 74 and 80 will be as follows:

The current will flow from the positive lead wire 92 into the arcuate contact 93 from which it will be conducted into the arcuate contact 85 by the pendulum stem portion 88. The current will flow from the contact strip 85 thru the branch wire 84 to the wire 81 connected to the brush 80. The remaining brush 74 will be connected to the negative line wire 92 by the wire 75, a portion of the resistance winding 76, and the pendulum stem portion 87.

In Figures 24 to 28 inclusive there is shown what has been previously termed a landing and take-off track by means of which the craft may be run out of the water on its ground engaging wheels and onto the track for permitting the craft to be loaded and unloaded and then turned around until it is headed out to sea for another trip. The track includes a pair of rails 97 carried by the uprights 98 which are suitably embedded in the ground at their lower ends and are supported by the concrete bases 99. The framework or body portion 5 is provided at its opposite ends with a plurality of wheels 100 which are illustrated in Fig. 27 as riding within the grooves of the tracks 97. A canal 101 is formed between a portion of the uprights 98 and communicates with the ocean or body of water 102. The entire track is shown in side elevation in Fig. 26 and is illustrated as having its receiving end 103 elevated to a proper height to cause the wheels 100 riding upon the tracks 97 to cooperate with the ground engaging wheels 58 and 59 for supporting the craft. As the rails 97 approach the canal 101, they gradually decrease in elevation so that the pontoons or skids 18 will be lowered into the water of the canal as the craft travels along the track. The discharge end 104 of the track projects out into the ocean or body of water 102.

Figure 29:
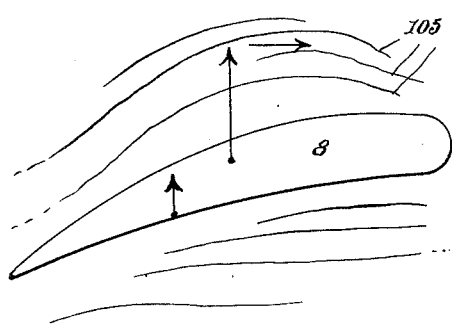
Figure 30:
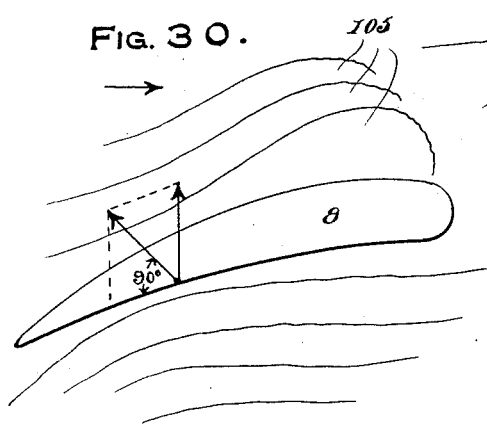
Figure 31:
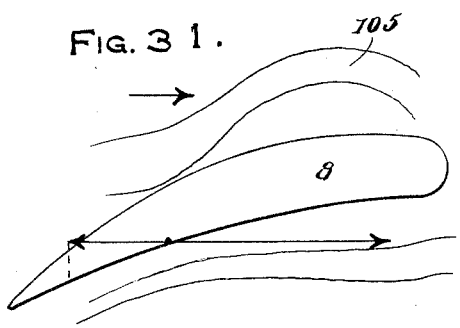

In Figs. 29 to 31, the monoplane 8 is diagrammatically illustrated with the air currents 105 which surround the same while the craft is traveling. The various arrow lines are intended to illustrate the directions in which the various air forces are applied to the monoplane.

Figures 32 to 34 inclusive illustrate diagrammatically one of the pontoons or skids and the water currents surrounding the same while the craft is traveling. The arrow lines in these figures are also intended to illustrate directions in which the supporting powers or forces are brought to bear against the sustaining surface of the pontoon.

It is to be understood that the form of this invention herewith shown and described is to be taken as a preferred example of the same, and that various changes in the shape, size, and arrangement of parts may be re-

Having thus described the invention, I claim:—

1. In a hydrocraft of the type described, a body portion, a cross shaft journaled therein, a transverse series of pontoons, upwardly converging supporting bars for the pontoons with the upper ends of the bars fixed to the shaft, means for rotating the shaft to vary the angularity of the pontoons in respect to the surface of the supporting water, a cabin carried by the upper part of the body portion, marine propulsion means carried by the frame and projecting below the pontoons, and a rudder carried by the body portion and depending below the propulsion means.

2. In a hydrocraft of the type described, a body portion, a cabin carried by the upper forward part of the same, a transverse series of pontoons connected to the under part of the body portion, a plane carried by the front of the body portion to sustain the front end while the craft is traveling, means to sustain the forward end of the craft elevated when idle and marine propulsion means carried by the body portion.

3. In a hydrocraft of the type described, a body portion, a cabin carried by the upper forward part of the same, a transverse series of pontoons connected to the under part of the body portion rearwardly of the transverse center thereof for supporting the rear end of the craft on water, a plane carried by the front of the body portion to sustain the same while the craft is traveling, a normally elevated float carried by the front of the body portion adapted to be lowered to sustain the forward end of the craft while the craft is standing idle in the water, and propulsion means for the body portion.

4. In a hydrocraft of the type described, a body portion, a cabin carried by the upper forward part of the same, a transverse series of pontoons connected to the under part of the body portion rearwardly of the transverse center thereof, for supporting the rear end of the craft on water, a plane carried by the front of the body portion to sustain the same while the craft is traveling, a normally elevated float carried by the forward end of the body portion to sustain the forward end of the craft while the craft is standing idle in the water, means for lowering and raising said float into and out of its operative position, and propulsion means for the craft.

5. In a hydrocraft of the type described, a body portion, a cabin carried by the upper forward part of the same, a transverse series of pontoons connected to the under part of the body portion rearwardly of the transverse center thereof, a plane carried by the front of the body portion to sustain the same while the craft is traveling, a pair of spaced guides depending from the body portion below the plane, ground wheel carrying rods hinged to the lower ends of the guide, an air tight tank disposed forwardly of the cabin and slidably carried by said guides, power means for moving the air tight tank upwardly and downwardly on the guides to arrange the same in and out of operative relation in respect to the supporting water, and propulsion means for the craft.

6. In a hydrocraft of the type described, a body portion, a cabin carried by the upper forward part of the same, a cross shaft journaled in the body portion rearwardly of the center of gravity, a transverse series of pontoons having upwardly converging supporting bars connected to the cross shaft, an electric motor operatively connected to the cross shaft for rotating the same to vary the angularity of the pontoons in respect to the surface of the supporting water, a plane carried by the front of the body portion to sustain the same while the craft is traveling, a pair of spaced guides depending from the body portion below the plane, an air tight tank slidably supported upon said guides, a rack bar projecting perpendicularly from said airtight tank, an electric motor having a pinion meshing with said rack bar for raising and lowering the air tight tank upon said guides to place the tank into and out of operative position in respect to the supporting water, and propulsion means for the craft.

7. In a hydrocraft of the type described, a body portion, a cabin carried by the upper forward part of the same, a transverse shaft journaled in said body portion, a series of pontoons, pairs of upwardly converging rods for connecting said pontoons to the transverse shaft for locating the pontoons below the body portion, and means for rotating said transverse shaft to vary the angularity of the pontoons in respect to the supporting water.

8. In hydrocraft of the type described, a body portion, a pontoon frame pivotally supported beneath the body portion and motor mechanism for varying the angularity of the pontoon frame with respect to the body portion and water surface to insure the retention of the body portion in a horizontal plane when the hydrocraft is travelling at different speeds, and motor operated ground wheel carrying hinged frame beneath the body portion to accommodate the hydrocraft for land use.

9. In a hydrocraft of the type described, a body portion, a pontoon frame pivotally supported beneath the body portion and motor mechanism for varying the angularity of the pontoon frame with respect to the body portion and water surface to insure the retention of the body portion in a horizontal plane when the hydrocraft is travelling at different speeds, and motor operated ground wheel carrying hinged frame beneath the body portion to accommodate the hydrocraft for land use, said pontoon frame being so disposed with respect to the body portion to sustain the rear end of the hydrocraft elevated and a vertically shiftable float at the forward end of the hydrocraft to be lowered for sustaining the forward end when the hydrocraft is idle on water.

10. In a hydrocraft of the type described, a body portion, a pontoon frame pivotally supported beneath the body portion and motor mechanism for varying the angularity of the pontoon frame with respect to the body portion and water surface to insure the retention of the body portion in a horizontal plane when the hydrocraft is travelling at different speeds, and motor operated ground wheel carrying hinged frame beneath the body portion to accommodate the hydrocraft for land use, said pontoon frame being so disposed with respect to the body portion to sustain the rear end of the hydrocraft elevated and a vertically shiftable float at the forward end of the hydrocraft to be lowered for sustaining the forward end when the hydrocraft is idle on water, and a rack and pinion construction for lowering and raising the float.

11. In hydrocraft of the type described, a body portion, a pontoon frame pivotally supported beneath the body portion and motor mechanism for varying the angularity of the pontoon frame with respect to the body portion and water surface to insure the retention of the body portion in a horizontal plane when the hydrocraft is travelling at different speeds, and motor operated ground wheel carrying hinged frame beneath the body portion to accommodate the hydrocraft for land use, the pontoon frame comprising a braced skid section and upwardly converging frame bars carrying the skid section and attached to the pivoted support.

In testimony whereof I affix my signature.

AKOS LUDASY.